United States Patent
Kriegel et al.

(10) Patent No.: US 7,325,615 B2
(45) Date of Patent: Feb. 5, 2008

(54) VISCOSIFIED TREATMENT FLUIDS COMPRISING POLYCARBOXYLIC ACID GELLING AGENTS AND ASSOCIATED METHODS

(75) Inventors: Robert M. Kriegel, Marietta, GA (US); Gary P. Funkhouser, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 178 days.

(21) Appl. No.: 11/119,571

(22) Filed: May 2, 2005

(65) Prior Publication Data

US 2006/0243446 A1 Nov. 2, 2006

(51) Int. Cl.
*E21B 43/26* (2006.01)

(52) U.S. Cl. .................. 166/308.5; 166/300; 166/283; 166/308.6

(58) Field of Classification Search ...................... None
See application file for complete search history.

(56) References Cited

U.S. PATENT DOCUMENTS

| | | | |
|---|---|---|---|
| 4,515,216 A | 5/1985 | Childs et al. | |
| 4,524,828 A | 6/1985 | Sabins et al. | |
| 4,582,139 A | 4/1986 | Childs et al. | |
| 5,007,481 A | 4/1991 | Williams et al. | |
| 5,256,315 A | 10/1993 | Lockhart et al. | |
| 5,402,846 A * | 4/1995 | Jennings et al. | 166/259 |
| 5,407,909 A * | 4/1995 | Goodhue et al. | 507/118 |
| 5,759,964 A | 6/1998 | Shuchart et al. | |
| 5,789,349 A * | 8/1998 | Patel | 507/121 |
| 5,975,206 A | 11/1999 | Woo et al. | |
| 6,245,252 B1 | 6/2001 | Hicks et al. | |
| 6,454,008 B1 | 9/2002 | Chatterji et al. | |
| 6,488,091 B1 | 12/2002 | Weaver et al. | |
| 6,986,391 B2 * | 1/2006 | Funkhouser et al. | 166/300 |
| 7,104,327 B2 * | 9/2006 | Harris et al. | 166/308.5 |
| 2002/0125012 A1 * | 9/2002 | Dawson et al. | 166/300 |

OTHER PUBLICATIONS

SPE Paper 80236 by Gary P. Funkhouser, et al., "Synthetic Polymer Fracturing Fluid for High-Temperature Applications", Society of Petroleum Engineers Inc., 2003.

SPE Paper 36492 by McGowen, et al., "Fracturing-Fluid Leakoff Under Dynamic Conditions Part 1: Development of a Realistic Laboratory Testing Procedure", presented at the 1996 SPE Annual Technical Conference and Exhibition, Denver, Colorado, Oct. 6-9, 1996.

* cited by examiner

*Primary Examiner*—Zakiya W. Bates
*Assistant Examiner*—Angela DiTrani
(74) *Attorney, Agent, or Firm*—Robert A. Kent; Baker Botts, L.L.P.

(57) ABSTRACT

Novel polycarboxylic acid copolymer gelling agents and viscosified treatment fluids comprising these gelling agents, and their associated methods of use and manufacture are provided. In one embodiment, a method comprising: providing a viscosified treatment fluid comprising an aqueous base fluid, and a gelling agent that comprises a polymerizable polycarboxylic acid and that is at least partially crosslinked by a crosslinking reaction comprising a crosslinking agent; and introducing the viscosified treatment fluid into a subterranean formation is provided.

20 Claims, 2 Drawing Sheets

VISCOSIFIED TREATMENT FLUIDS COMPRISING POLYCARBOXYLIC ACID GELLING AGENTS AND ASSOCIATED METHODS

CROSS REFERENCE TO RELATED APPLICATIONS

This application is related to application Ser. No. 11/119,668 filed on the same day herewith.

BACKGROUND

The present invention relates to fluids useful as subterranean viscosified treatment fluids, and more particularly, to novel polycarboxylic acid copolymer gelling agents and viscosified treatment fluids comprising these gelling agents, and their associated methods of use and manufacture.

As used herein, the term "treatment fluid" refers to any fluid that may be used in a subterranean application in conjunction with a desired function and/or for a desired purpose. The term "treatment fluid" does not imply any particular action by the fluid or any component thereof. Viscosified treatment fluids are used in a variety of operations in subterranean formations. For example, viscosified treatment fluids have been used as drilling fluids, fracturing fluids, and gravel packing fluids. Viscosified treatment fluids generally have a viscosity that is sufficiently high, for example, to suspend particulates for a desired period of time, to transfer hydraulic pressure, and/or to prevent undesired leak-off of fluids into a formation. Viscosified treatment fluids are often used in fracturing operations. Hydraulic fracturing is a technique for stimulating the production of desirable fluids from a subterranean formation. The technique normally involves introducing a viscosified treatment fluid through a well bore into a formation at a chosen rate and pressure to enhance and/or create a fracture in a portion of the formation, and placing proppant particulates in the resultant fracture, inter alia, to maintain the fracture in a propped condition when the pressure is released. The resultant propped fracture provides a conductive channel in the formation for fluids to flow to the well bore. The degree of stimulation afforded by the hydraulic fracturing treatment is largely dependent on the conductivity and width of the propped fracture.

Viscosified treatment fluids (e.g., fracturing fluids) that are used in subterranean operations generally are aqueous-based fluids that comprise a gelling agent, which may be crosslinked. These gelling agents may be biopolymers or synthetic polymers. Common biopolymer gelling agents include, e.g., galactomannan gums, cellulosic polymers, and other polysaccharides. Because of their cost and effectiveness, biopolymers are most commonly used. However, in high temperature applications, these gelling agents can degrade, which can cause the viscosified treatment fluid to prematurely lose viscosity. Various synthetic polymer gelling agents have been developed for use in viscosified treatment fluids. While some synthetic polymers have achieved some success, there are continuing needs for improved synthetic gelling agents that are stable at relatively high temperatures (e.g., above 300° F.).

The viscosity of a viscosified treatment fluid may be increased by crosslinking the gelling agent in the fluid. Gelling agent molecules are typically crosslinked through a crosslinking reaction with a crosslinking agent that has been added to the treatment fluid. These crosslinking agents generally comprise a metal, transition metal, or metalloid, collectively referred to herein as "metal(s)." Examples include boron, aluminum, antimony, zirconium, magnesium, or titanium. Generally, the metal of a crosslinking agent interacts with at least two gelling agent molecules to form a crosslink between them. Under the appropriate conditions (e.g., pH and temperature), the crosslinks that form between gelling agent molecules may increase the viscosity of a viscosified treatment fluid.

One type of fracturing fluid has been developed for use in deep, high temperature wells comprises a crosslinked synthetic gelling agent. The gelling agent is a high molecular weight copolymer of 60% to 78% acrylamide and 22% to 40% potassium acrylate crosslinked with a titanium or zirconium compound. In preferred embodiments, the copolymer comprises about 30% of the acrylate monomer to achieve optimal crosslinking. Unfortunately, an acrylate concentration this high may cause the gelling agent to have poor salt tolerance in subterranean applications, and therefore, these fluids are not optimal in higher pressure and temperature deep wells.

Viscous foamed treatment fluids have been used in conventional fracturing operations. Benefits of using foamed treatment fluids in such operations include a reduced risk of: leak-off of the fluid into a permeable formation, and damage to the formation by polymer residue deposits. Also, because a foamed treatment fluid is less dense than a conventional treatment fluid, flow back of the fluid may occur.

The gases typically used in forming foamed treatment fluids usually are nitrogen, carbon dioxide, and mixtures thereof. Generally carbon dioxide is more economical for wells having greater depths and correspondingly higher pressures and temperatures. Carbon dioxide can be pumped at a lower wellhead pressure than nitrogen because it has a higher density than nitrogen at similar conditions.

Carbon dioxide foamed fracturing fluids heretofore have been utilized in subterranean zone having temperatures up to about 400° F. However, the viscosity of a foamed fracturing fluid is at least partially dependent upon the liquid phase thereof, and the viscous liquids utilized heretofore have generally been unstable at temperatures above about 300° F. Aqueous gelled liquids containing gelling agents such as guar, hydroxypropylguar, and carboxymethylhydroxypropylguar lose viscosity by thermal thinning, and become hydrolytically unstable above about 350° F. Also, at 350° F. and above, the heretofore used carbon dioxide foamed treatment fluids have not demonstrated desirable proppant particle carrying capability.

SUMMARY

The present invention relates to fluids useful as subterranean viscosified treatment fluids, and more particularly, to novel polycarboxylic acid copolymer gelling agents and viscosified treatment fluids comprising these gelling agents, and their associated methods of use and manufacture.

In one embodiment, the present invention provides a method comprising: providing a viscosified treatment fluid comprising an aqueous base fluid, and a gelling agent that comprises a polymerizable polycarboxylic acid and that is at least partially crosslinked by a crosslinking reaction comprising a crosslinking agent; and introducing the viscosified treatment fluid into a subterranean formation.

In another embodiment, the present invention provides a method of fracturing a portion of a subterranean formation comprising: providing a fracturing fluid comprising an aqueous base fluid, and a gelling agent that comprises a polymerizable polycarboxylic acid that is at least partially crosslinked by a crosslinking reaction comprising a crosslinking agent; placing the fracturing fluid into a subterranean formation under conditions effective to create or enhance a fracture in a portion of the subterranean formation.

In another embodiment, the present invention provides a method comprising: providing a viscosified treatment fluid comprising an aqueous base fluid, a gelling agent that comprises a polymerizable polycarboxylic acid, and a crosslinking agent; and introducing the viscosified treatment fluid into a subterranean formation.

The features and advantages of the present invention will be readily apparent to those skilled in the art upon a reading of the description of the preferred embodiments that follows.

BRIEF DESCRIPTION OF THE FIGURES

These drawings illustrate certain aspects of some of the embodiments of the present invention, and should not be used to limit or define the invention.

DESCRIPTION OF PREFERRED EMBODIMENTS

Figure 1:
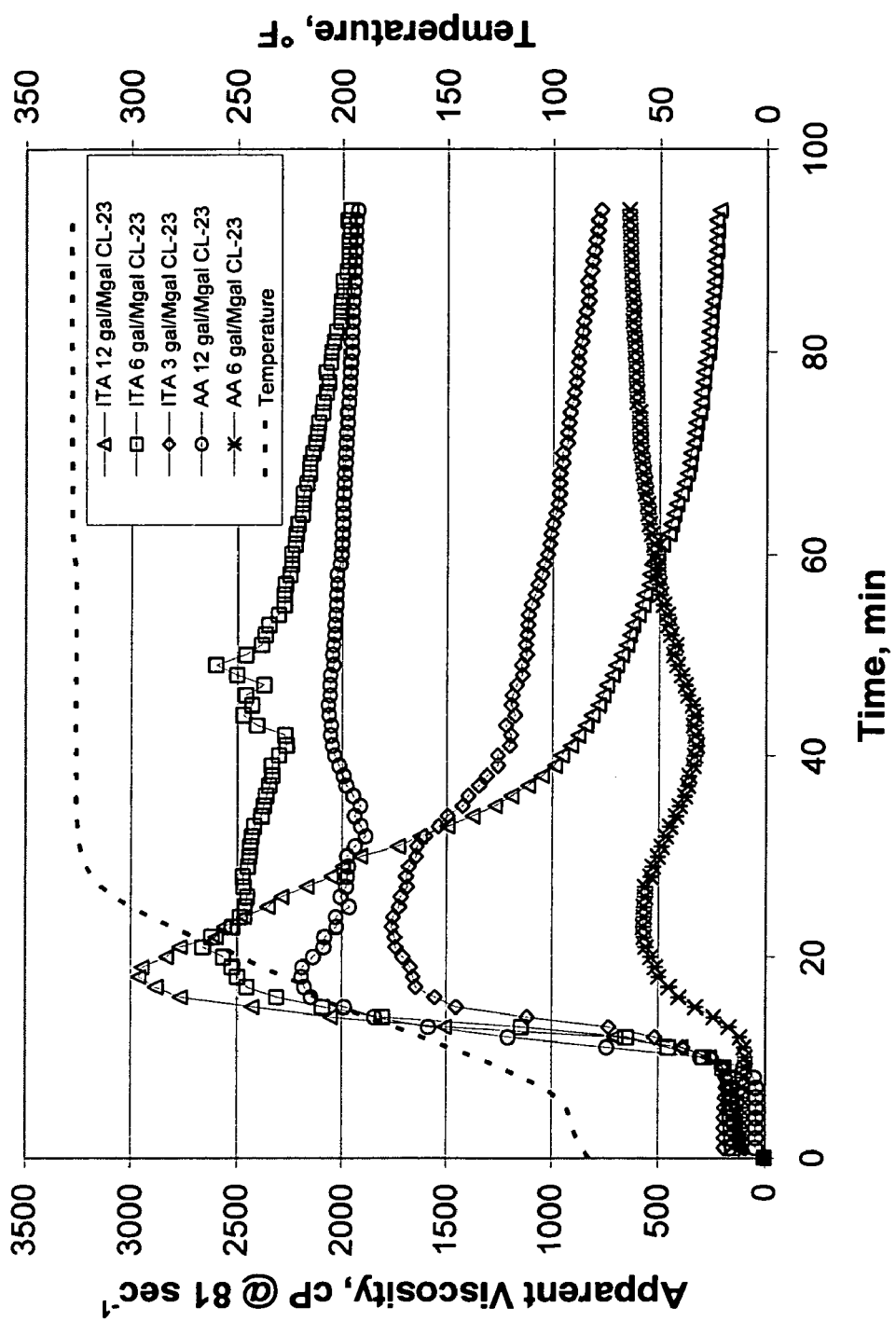
FIG. 1 illustrates a graph of the results from experiments relating to the performance of polymers containing itaconic acid or acrylic acid at various crosslinker concentrations.

The present invention relates to fluids useful as subterranean viscosified treatment fluids, and more particularly, to novel polycarboxylic acid copolymer gelling agents and viscosified treatment fluids comprising these gelling agents, and their associated methods of use and manufacture. The viscosified treatment fluids of the present invention may be useful in any application requiring a viscosified treatment. They are especially suitable for any subterranean application requiring a viscosified treatment fluid, and they may be particularly suited for use in, for example, fracturing applications. These fluids may be particularly useful in hard rock fracturing applications involving higher temperatures and or pressures, e.g., in deeper wells. In certain embodiments, the viscosified treatment fluids of the present invention are useful in subterranean applications involving fluid temperatures of up to and including about 415° F. In certain embodiments, the viscosified treatment fluids of the present invention are useful in subterranean applications involving a bottom hole temperature of up to and including about 450° F. Higher temperature reservoirs may be treated with cooling pre-flushes if desired, e.g., to prevent possible damage to the fluid.

One of the advantages of the gelling agents of the present invention is that they require less of the crosslinking agent than previous gelling agents to achieve the same viscosity effect. Using less crosslinker means that the fluid is potentially less damaging to the formation in that less residue is deposited in the formation after the fluid breaks. The permeability of the formation is not undesirably negatively impacted by the gelling agent.

The viscosified treatment fluids of the present invention comprise an aqueous base fluid, and a gelling agent that comprises a polymerizable polycarboxylic acid copolymer. Optionally, the gelling agent may be at least partially crosslinked by a crosslinking reaction comprising a crosslinking agent. The viscosified treatment fluids also may comprise a suitable breaker, if desired. In alternative embodiments, the viscosified treatment fluids of the present invention may be foamed. In such embodiments, the viscosified treatment fluids also comprise a gas, and a foaming agent. Optionally, other additives suitable for use in conjunction with the viscosified treatment fluids of the present invention may be added if desired.

The gelling agents of the present invention comprise a polymerizable polycarboxylic acid copolymer comprising the following three monomeric units: 2-acrylamido-2-methylpropanesulfonic acid or salts thereof (hereinafter referred to collectively as "AMPS"); a polymerizable polycarboxylic acid or salts thereof (hereinafter referred to collectively as "a polymerizable polycarboxylic acid"); with the balance being acrylamide. Suitable polymerizable polycarboxylic acids have vicinal carboxylic acid groups. Examples include itaconic acid, maleic acid, 3-butene-1,2,3-tricarboxylic acid, and fumaric acid. Also suitable are any precursors of these acids. The gelling agents of the present invention, generally speaking, hydrate in the presence of an aqueous fluid, and can be easily crosslinked by suitable metal ions.

In preferred embodiments, the monomeric units in a polycarboxylic acid copolymer are arranged in random fashion rather than in a block arrangement. A block arrangement may not be as desirable because it may inhibit the ability of the gelling agent to crosslink.

In certain embodiments, the weight fraction of the AMPS in the polycarboxylic acid copolymer may be from about 15% to about 80% by weight (preferably about 60%) of the copolymer, the weight fraction of the polymerizable polycarboxylic acid may be from about 0.1% to about 1% by weight (preferably about 0.1% to 0.5%) of the copolymer, and acrylamide may comprise the balance of the weight of the copolymer.

Formulae 1-3 below illustrate some embodiments of the polymerizable polycarboxylic acid copolymers of the gelling agents of the present invention:

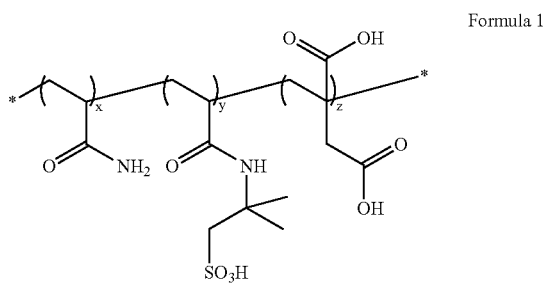

Poly(acrylamide-co-AMPS-co-itaconic acid)

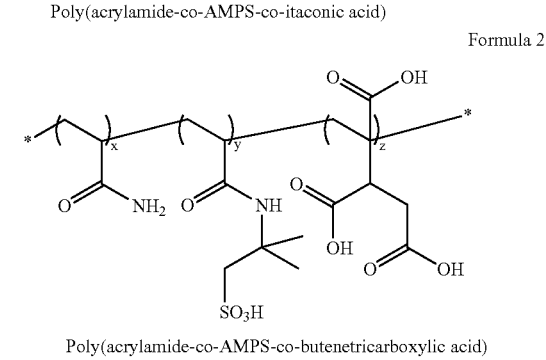

Poly(acrylamide-co-AMPS-co-butenetricarboxylic acid)

-continued

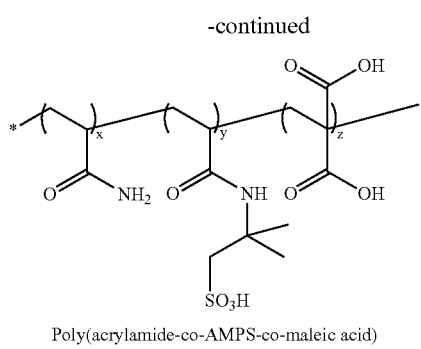

Formula 3

Poly(acrylamide-co-AMPS-co-maleic acid)

Salts of these acids may also be appropriate.

Preferably, the polycarboxylic acid copolymers of the gelling agents of the present invention may be at least partially crosslinked by a crosslinking reaction that comprises any suitable crosslinking agent. Preferred crosslinking agents include zirconium-based crosslinking agents and titanium-based crosslinking agents. Hafnium also may be suitable. Zirconium-based commercially available crosslinking agents suitable for use in this invention include those available under the trade names "CL-23" and "CL-24," which are both available from Halliburton Energy Services in Duncan, Oklahoma. Boron-based crosslinking agents are not preferred.

Importantly, in the preferred embodiments, less of the crosslinking agent than previously thought to have been needed is required when using the gelling agents of the present invention to achieve a given viscosity for a viscosified treatment fluid. In certain embodiments, the crosslinking agent may be included in a viscosified treatment fluid in an amount in the range of from about 0.02% to about 1.2% by volume of the aqueous base fluid, more preferably in the amount of about 0.5%.

The aqueous base fluid may include fresh water, or water containing one or more salts dissolved therein. Fresh water or a 2% KCl brine may be preferred. The water can be from any source, as long as it does not contain an excess of compounds that adversely affect other components in the treatment fluid. Potentially problematic ions include divalent and trivalent ions that may form complexes with the gelling agent that may impede crosslinking. These potentially problematic ions include calcium, iron, aluminum, and magnesium.

In embodiments wherein the viscosified treatment fluids of the present invention are foamed, gases and foaming agents may be included in the fluids. While various gases can be utilized for foaming the viscous aqueous fracturing fluids of this invention, nitrogen, carbon dioxide, and mixtures thereof are preferred. In examples of such embodiments, the gas may be present in a viscosified treatment fluid in an amount in the range of from about 5% to about 95% by volume of the treatment fluid, and more preferably in the range of from about 20% to about 70%. The amount of gas to incorporate into the fluid may be affected by factors including the viscosity of the fluid and wellhead pressures involved in a particular application. Examples of preferred foaming agents that can be utilized to foam and stabilize the viscosified treatment fluids of this invention include, but are not limited to, $C_8$ to $C_{22}$ alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Cocoamidopropyl betaine is especially preferred. Other suitable foaming agents and foam stabilizing agents may be included as well, which will be known to those skilled in the art with the benefit of this disclosure. The foaming agent is generally present in a viscosified treatment fluid of the present invention in an amount in the range of from about 0.1% to about 2.0% by weight, more preferably in the amount of from about 0.2% to about 1.0% and most preferably about 0.6%.

In some applications, after a viscosified treatment fluid has performed its desired function, its viscosity may be reduced, which often is referred to as "breaking" the viscosified treatment fluid. Breaking a viscosified treatment fluid may occur naturally over time or, e.g., by adjusting the pH of the viscosified treatment fluid. Breaking a viscosified treatment fluid typically involves incorporating suitable "breakers" in the viscosified treatment fluid. For the viscosified treatment fluids of the present invention, suitable breakers include oxidizers and acids. Because acids may not achieve sufficient viscosity reduction in certain circumstances, oxidizers are generally preferred. In certain embodiments, the breaker may be formulated or presented in a manner in which it may act in a delayed fashion. Examples of such delayed breakers include, but are not limited to, encapsulated breakers, (e.g., encapsulated oxidizers,). Alternatively, any of the delayed breakers conventionally used with metal ion crosslinking agents may be used, for example, oxidizers such as sodium chlorite, sodium bromate, sodium persulfate, ammonium persulfate, encapsulated sodium persulfate, potassium persulfate, or ammonium persulfate and the like as well as magnesium peroxide. One should note that persulfates may break a treatment too quickly at high temperatures. Sodium bromate is a preferred breaker. The specific breaker used, whether or not it is encapsulated, and the amount thereof employed, will depend upon the breaking time desired, the nature of the gelling agent and crosslinking agent, formation characteristics and conditions, and other factors known, with the benefit of this disclosure, to individuals skilled in the art.

In certain embodiments, the viscosified treatment fluids of the present invention may comprise particulate materials like proppant or gravel that can be utilized in, for example, subterranean applications like fracturing operations. Suitable particulate materials include, but are not limited to, graded walnut or other nut shells, resin-coated walnut or other nut shells, graded sand, resin-coated sand, sintered bauxite, various particulate ceramic materials, glass beads, various particulate polymeric materials, and the like. The particular size of the particulate material employed may depend on the particular application for which the particulate materials are being used, characteristics of the subterranean formation, and characteristics of the particular gelled nonaqueous treatment fluid being used, as well as other variables. Generally, the sizes of suitable particulates may vary in the range of from about 2 mesh to about 200-mesh, U.S. Sieve Series scale. The particulates may be coated with a curable resin and/or a tackifier if desired. One of ordinary skill in the art, with the benefit of this disclosure, will be able to choose an appropriate particulate material for a given application.

Additional additives may be present in the viscosified treatment fluids of the present invention as deemed appropriate by one skilled in the art with the benefit of this disclosure. Examples of such additives include, but are not limited to, surfactants, scale inhibitors, clay stabilizers, gases, antifoaming agents, foaming agents, storage stabilizers, biocides, biostatic agents, or combinations thereof. An example of an additive that may be included is a pH buffer.

In certain embodiments, the pH of a viscosified treatment fluid should be maintained in the range of from about 4 to about 6. While various buffers may be suitable, a particularly suitable buffer is acetic acid-acetate. When used, the buffer should be included in a viscosified treatment fluid in an amount in the range of from about 0.1% to about 1.0% v/v.

An embodiment of a method of making the viscosified treatment fluids of the present invention comprises the steps of: combining and a gelling agent that comprises a polymerizable polycarboxylic acid and an aqueous base fluid so that the gelling agent hydrates in the aqueous base fluid; adjusting the pH of the fluid to a range of from about 4.5 to about 7 (5 to 6 may be preferred) with a suitable pH adjuster; and allowing a viscosified treatment fluid to form. Suitable pH adjusters include any pH adjuster that is compatible with the gelling agents of the present invention. Examples include buffers (e.g., an acetate buffer). A suitable crosslinking agent may be added so that the gelling agent at least partially crosslinks.

The viscosified treatment fluids of the present invention can be utilized for carrying out a variety of subterranean well treatments, including, but not limited to, fracturing operations. In certain exemplary embodiments wherein a viscosified treatment fluid is used in conjunction with fracturing operations, fracturing fluids comprising an aqueous base fluid and a gelling agent that comprises a polymerizable polycarboxylic acid of this invention may be placed in a subterranean formation at a sufficient pressure to create or enhance one or more fractures in a portion thereof. In some instances, the gelling agent will be at least partially crosslinked by a reaction comprising a suitable crosslinking agent. After the fracturing fluid has performed its desired function, or after a desired period of time, the viscosity of the fracturing fluid may be reduced (e.g., by a breaker) and at least a portion of the fracturing fluid may be recovered.

In one example of the methods of this invention, a viscosified treatment fluid comprising a gelling agent that comprises a polymerizable polycarboxylic acid that is at least partially crosslinked by a reaction comprising a suitable crosslinking agent is placed into a subterranean formation at a rate and pressure sufficient to create or enhance a fracture therein. The viscosified treatment fluid may be broken to form a reduced viscosity treatment fluid, and then the reduced viscosity treatment fluid may be at least partially recovered at the surface. In an alternative embodiment, the viscosified treatment fluid may be foamed.

To facilitate a better understanding of the present invention, the following examples of preferred embodiments are given. In no way should the following examples be read to limit, or define, the scope of the invention.

EXAMPLES

Polymer Synthesis: Polymers were prepared from 10% w/w solutions of monomer in degassed, deionized water. Monomer composition was 60% w/w AMPS, x % w/w carboxylic acid monomer, and (40-x) % w/w acrylamide. Approximately 15 ppm of potassium persulfate was added as an initiator. The solutions were contained in tightly-capped, glass bottles. Bottles were placed in a 65° C. water bath for four hours and then cooled to room temperature.

Rheological Characterization at 400° F.: The 10% polymer solution was diluted to 0.75% with water while shearing in a Waring blender. The solution was neutralized to pH 5-6 with sodium hydroxide. Acetic acid/acetate buffer, if used, was added at the concentration indicated. Zirconium crosslinker (CL-23) was then added. Viscosity was measured at 400° F. using a Fann model 50 viscometer with a B5X bob at 95 rpm (81 sec$^{-1}$) and a preheated bath.

Rheological Characterization at 330° F.: The 10% polymer solution was diluted to 1% with water while shearing in a Waring blender. The solution was neutralized to pH 5-6 with sodium hydroxide. Zirconium crosslinker (CL-23) was added at the concentration indicated. Viscosity was measured at 330° F. using a Brookfield PVS viscometer with a B5 bob at 95 rpm (81 sec$^{-1}$).

Comparison of Itaconic Acid and Acrylic Acid at 330° F. The acrylic acid copolymer composition used was: 0.5% acrylic acid, 60% AMPS, and 39.5% acrylamide. The itaconic acid copolymer composition used was: 0.45% itaconic acid, 60% AMPS, and 39.55% acrylamide. The concentrations of carboxylic acid monomers were selected to give polymers with the same concentration of carboxylate groups. 1% solutions of the polymers were adjusted to pH of about 5.3 with sodium hydroxide, and CL-23 crosslinker was added in the concentrations shown in FIG. 1. High viscosity is achieved with the itaconic acid copolymer using a crosslinker concentration of 6 gal/Mgal. To obtain similar performance with the acrylic acid copolymer, twice the amount of crosslinker (12 gal/Mgal) is required. If 12 gal/Mgal of crosslinker is used with the itaconic acid copolymer, overcrosslinking and viscosity degradation appears to occur. Good viscosity is obtained from the itaconic acid copolymer with only 3 gal/Mgal of crosslinker, exceeding the viscosity of the acrylic acid copolymer with 6 gal/Mgal of crosslinker.

Figure 2:
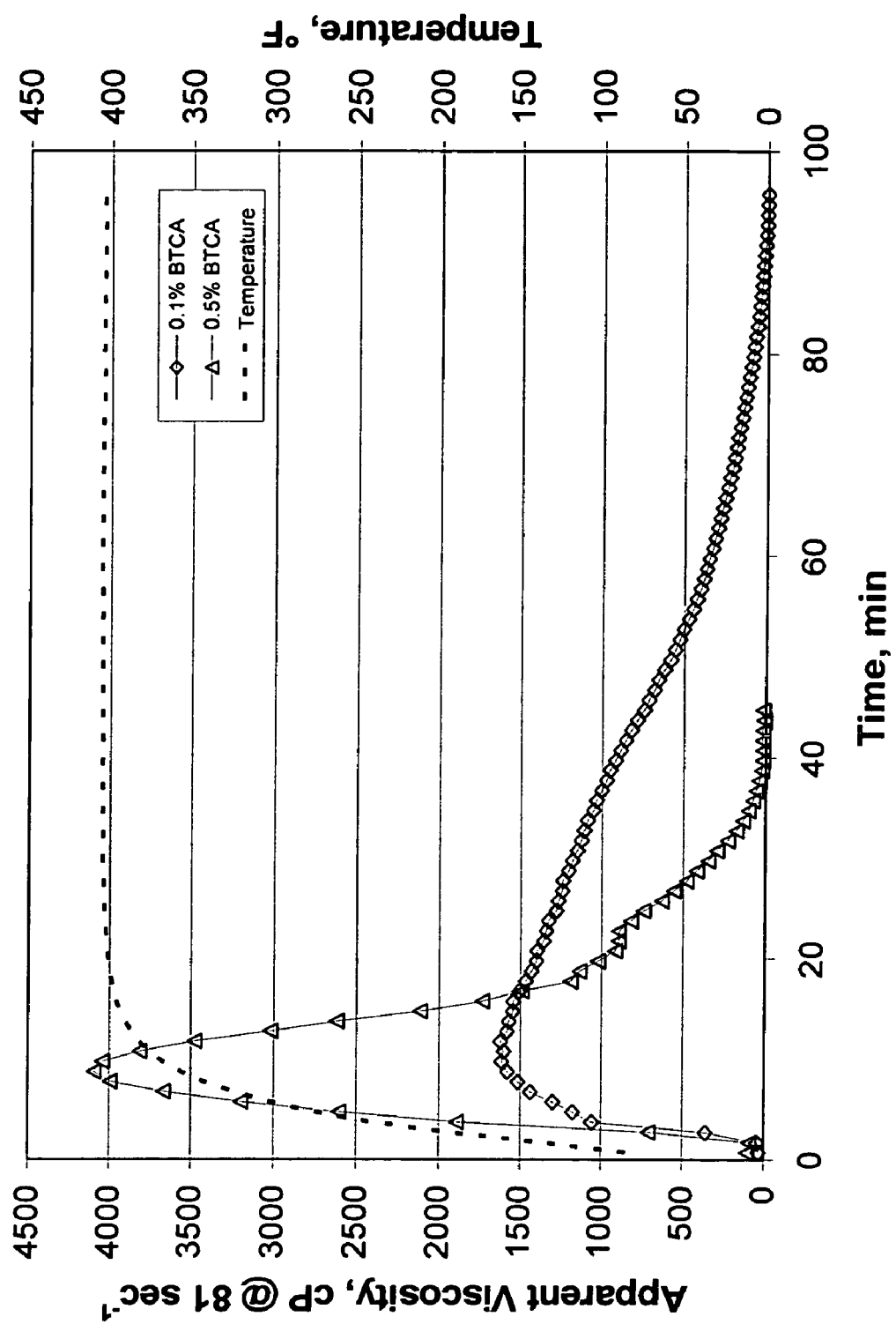
FIG. 2 illustrates a graph of the results from experiments relating to the performance of polymers containing 3-butene-1,2,3-tricarboxylic acid at 400° F.

Comparison of 3-Butene-1,2,3-tricarboxylic Acid (BTCA) Copolymers at 400° F. Polymers were prepared that contain 0.1% or 0.5% BTCA, 60% AMPS, and acrylamide, q.s. 0.75% solutions of the polymers were adjusted to pH 5-6 with sodium hydroxide and 3 gal/Mgal acetic acid/acetate buffer was added. Each solution was crosslinked with 3 gal/Mgal of CL-23 zirconium crosslinker. Good performance was observed with the polymer containing 0.1% BTCA (see FIG. 2). The higher concentration of BTCA provides higher maximum viscosity, but shear degrades more quickly due to higher crosslinking density.

Therefore, the present invention is well adapted to attain the ends and advantages mentioned as well as those that are inherent therein. While numerous changes may be made by those skilled in the art, such changes are encompassed within the spirit of this invention as defined by the appended claims, in which the terms used should be construed to have their plain, ordinary meaning except where specifically defined by the patentees.

What is claimed is:

1. A method comprising:
   providing a viscosified treatment fluid comprising an aqueous base fluid, and a gelling agent that comprises a polymerizable polycarboxylic acid copolymer and that is at least partially crosslinked by a crosslinking reaction comprising a crosslinking agent; and
   introducing the viscosified treatment fluid into a subterranean formation.

2. The method of claim 1 wherein the step of introducing the viscosified treatment fluid into a subterranean formation involves a fracturing application.

3. The method of claim 1 wherein the subterranean formation comprises a bottom hole temperature of up to and including about 450° F.

4. The method of claim 1 wherein the viscosified treatment fluid is at least partially foamed.

5. The method of claim 1 wherein the viscosified treatment fluid comprises an additive selected from the group consisting of: a breaker; a gas; a foaming agent; fresh water; water comprising a salt; a brine; a KCl brine; a particulate material; a surfactant; a scale inhibitor; a clay stabilizer; an antifoaming agent; a storage stabilizer; a biocide; a buffer; and a biostatic agent.

6. The method of claim 1 wherein the viscosified treatment fluid comprises a gas present in an amount of from about 5% to about 95% by volume.

7. The method of claim 1 wherein the gelling agent comprises a component corresponding to a formula selected from the group consisting of:

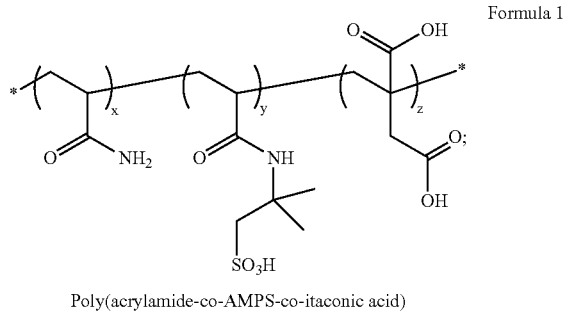

Poly(acrylamide-co-AMPS-co-itaconic acid)

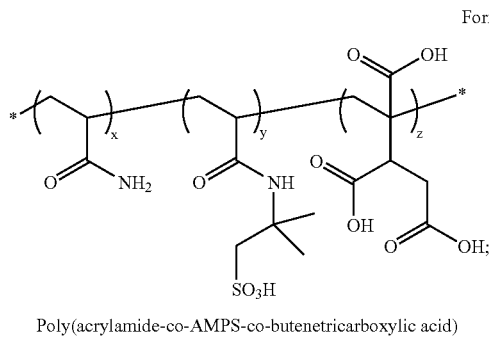

Poly(acrylamide-co-AMPS-co-butenetricarboxylic acid)

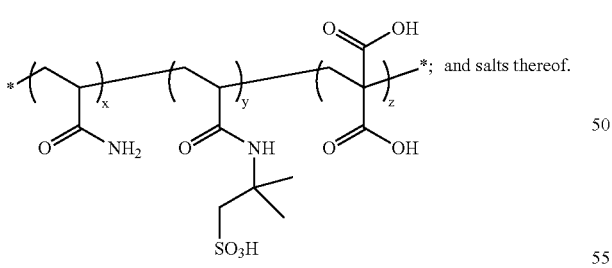

Poly(acrylamide-co-AMPS-co-maleic acid)

8. The method of claim 1 wherein the crosslinking agent comprises a component selected from the group consisting of: a zirconium-based crosslinking agent, a titanium-based crosslinking agent, and a hafnium-based crosslinking agent.

9. The method of claim 1 wherein the crosslinking agent is present in the viscosified treatment fluid in an amount of from about 0.02% to about 1.2% by volume of the aqueous base fluid.

10. A method of fracturing a portion of a subterranean formation comprising:

providing a fracturing fluid comprising an aqueous base fluid, and a gelling agent that comprises a polymerizable polycarboxylic acid copolymer that is at least partially crosslinked by a crosslinking reaction comprising a crosslinking agent; and placing the fracturing fluid into a subterranean formation so as to create or enhance a fracture in a portion of the subterranean formation.

11. The method of claim 10 wherein the subterranean formation comprises a bottom hole temperature of up to and including about 450° F.

12. The method of claim 10 wherein the fracturing fluid is at least partially foamed.

13. The method of claim 10 wherein the fracturing fluid comprises an additive selected from the group consisting of: a breaker; a gas; a foaming agent; fresh water; water comprising a salt; a brine; a KCl brine; a particulate material; a surfactant; a scale inhibitor; a clay stabilizer; an antifoaming agent; a storage stabilizer; a biocide; a buffer; and a biostatic agent.

14. The method of claim 10 wherein the gelling agent comprises at least one component corresponding to a formula selected from the group consisting of: Formula 1 shown below, Formula 2 shown below, and salts thereof:

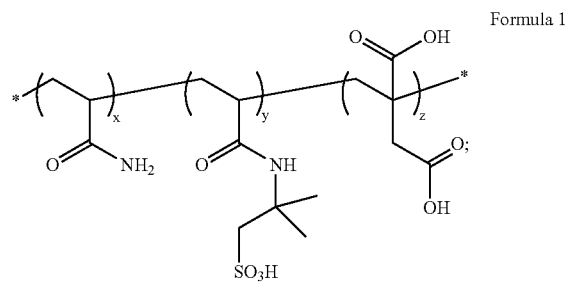

Poly(acrylamide-co-AMPS-co-itaconic acid)

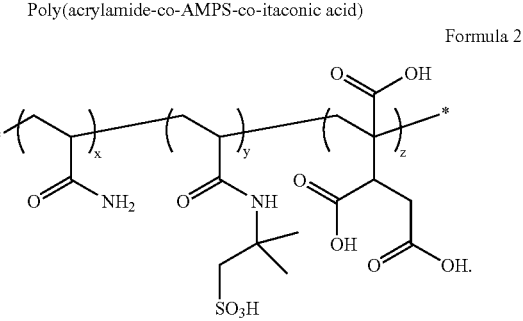

Poly(acrylamide-co-AMPS-co-butenetricarboxylic acid)

15. The method of claim 10 wherein the crosslinking agent is present in the fracturing fluid in an amount of from about 0.02% to about 1.2% by volume of the aqueous base fluid.

16. The method of claim 10 wherein the crosslinking agent comprises a component selected from the group consisting of: a zirconium-based crosslinking agent and a titanium-based crosslinking agent.

17. The method of claim 10 wherein the fracturing fluid comprises a gas present in an amount of from about 5% to about 95% by volume of the fracturing fluid.

18. A method comprising:

providing a viscosified treatment fluid comprising an aqueous base fluid, a gelling agent that comprises a polymerizable polycarboxylic acid copolymer, and a crosslinking agents, wherein the polycarboxylic acid copolymer is at least partially crosslinked by a crosslinking reaction comprising the crosslinking agent; and introducing the viscosified treatment fluid into a subterranean formation.

19. The method of claim 18 wherein a component of the polycarboxylic acid copolymer gelling agent comprises at least one component corresponding to a formula selected from the group consisting of: Formula 1 shown below, Formula 2 shown below, Formula 3 shown below, and salts thereof:

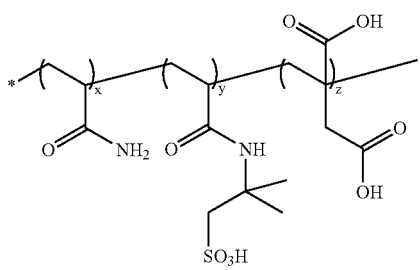

Formula 1

Poly(acrylamide-co-AMPS-co-itaconic acid)

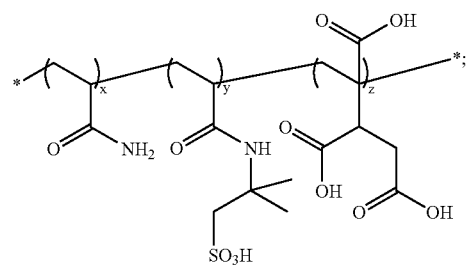

Formula 2

Poly(acrylamide-co-AMPS-co-butenetricarboxylic acid)

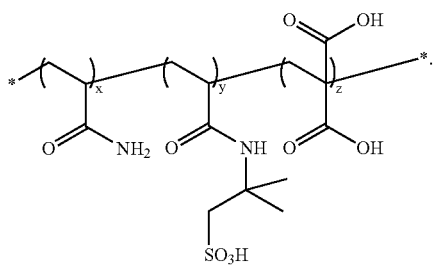

Formula 3

Poly(acrylamide-co-AMPS-co-maleic acid)

20. The method of claim 18 wherein the crosslinking agent is present in the crosslinking reaction in an amount of from about 0.02% to about 1.2%.

* * * * *